United States Patent [19]

Krohn

[11] Patent Number: 5,346,370
[45] Date of Patent: Sep. 13, 1994

[54] PORTABLE PUMPING SYSTEM WITH GENERATOR POWERED CLUTCH ASSEMBLY

[75] Inventor: Duane D. Krohn, Westminster, Colo.

[73] Assignee: Graco Inc., Golden Valley, Minn.

[21] Appl. No.: 149,051

[22] Filed: Nov. 8, 1993

[51] Int. Cl.$^5$ .................. F04B 9/00; H02K 7/10
[52] U.S. Cl. .................. 417/223; 417/234; 417/319; 417/362; 192/84 C; 310/78; 310/94
[58] Field of Search ............ 417/212, 223, 234, 319, 417/360, 362, 423.6; 192/107 M, 84 C; 310/92, 94, 103, 78

[56] References Cited

U.S. PATENT DOCUMENTS

| | | | |
|---|---|---|---|
| 2,278,507 | 4/1942 | Baudry | 310/94 |
| 2,850,654 | 9/1958 | Jaeschke | 310/94 |
| 4,009,971 | 3/1977 | Krohn et al. | 417/223 |
| 4,546,865 | 10/1985 | Hodgman et al. | |
| 4,721,439 | 1/1988 | Leinweber | 417/223 |
| 4,840,543 | 6/1989 | Geberth, Jr. | 417/223 |
| 4,894,570 | 1/1990 | Kaneyuki | |
| 4,967,887 | 11/1990 | Annacchino et al. | 310/78 |
| 5,025,906 | 6/1991 | O'Neil et al. | |
| 5,030,865 | 7/1991 | Rockey et al. | 310/78 |

Primary Examiner—Richard A. Bertsch
Assistant Examiner—Roland G. McAndrews, Jr.
Attorney, Agent, or Firm—Palmatier, Sjoquist & Helget

[57] ABSTRACT

A liquid pumping system adaptable for connection to either an electrical drive motor or an internal combustion engine, wherein a generator and clutch is coupled to the driving source, and a pressure sensing switch is connected to the generator rotor to selectively provide voltage to a rectifier circuit and field winding for the clutch. The energization of the field winding causes the clutch to actuate and thereby causes a mechanical coupling to a reciprocable pump for developing liquid pressure.

15 Claims, 5 Drawing Sheets

PORTABLE PUMPING SYSTEM WITH GENERATOR POWERED CLUTCH ASSEMBLY

BACKGROUND OF THE INVENTION

This invention relates to motor-driven pumps; more particularly the invention relates to a portable pumping system having capability for interchanging the driving source by utilizing a self-powered clutch for coupling between a reciprocable pump and any of a plurality of motor drive devices. The invention finds particular utility in portable pumping systems for which an electrical drive motor may be interchangeably used with an internal combustion drive motor, when external electrical power is not available. In such situations, the invention supplies its own electrical power needs to enable the drive motor to be efficiently coupled to a pumping system.

Prior art devices have included electrically-driven clutch assemblies in a common housing with an electrical generator; for example, U.S. Pat. No. 4,967,887, issued Nov. 6, 1990, discloses a magnetic particle clutch contained in the same housing as a permanent magnet generator, wherein the casing of the clutch is connected to a motor drive shaft and the rotor or disk of the clutch is connected to a load, and the rotor of the generator is also carried by the clutch casing; the generator produces an output voltage to power control circuitry for controlling the engagement of the clutch. The purpose of the patented invention is to provide an adjustable "soft start" to slowly bring the rotational speed of the load in synchronism with the speed of the drive motor.

In motor-driven pumping systems there is a need to control the action of the pump in response to the liquid pressure of the material being pumped. One approach, which has been used when an electrical motor is used to drive a pump, is to place a liquid pressure switch in the liquid delivery line and connect the switch to the electrical motor. When the liquid pressure reaches a predetermined level, the switch actuates and shuts off the power to the motor, thereby shutting down the pump. However, this approach does not work when an internal combustion engine is used to drive the pump, for the irregular stopping and starting of an internal combustion engine is an impractical solution to the problem. In this case, some form of clutch mechanism must be used so that the internal combustion engine may remain operating while the pump becomes disengaged from the engine.

It is desirable to provide a pumping system which may be interchangeably connected to either an electrical drive motor or to an internal combustion engine. Further, it is desirable that the motor control mechanism and power source be a part of the pumping system so that connection to the drive source can be expeditiously accomplished by a simple mechanical connection. This approach enables the pumping system to be manufactured separately from the drive mechanism without regard to the particular drive mechanism which might be selected for particular applications, and the drive motor/pump connection may be interchangeably made in the field, based upon the needs at the time.

SUMMARY OF THE INVENTION

The invention comprises a portable wheeled cart containing a first housing for an electrical clutch and generator assembly which is adapted for connection to a motor drive source and a second housing, connected to the first housing, for a reciprocable pump. An input-driven shaft is drivingly connected, via a belt and pulley or similar driving connection, to a motor drive source; a generator in the first housing has a permanent magnet rotor connected to the driven shaft and to a clutch plate of a magnetic clutch assembly. A fixed generator stator is connected, via a pressure switch, to the electrical field winding of the magnetic clutch assembly, and the armature element of the clutch assembly is connected to an output shaft which is geared to drive a crank arm of a reciprocable pump in the second housing.

It is a principal object and advantage of the invention to provide a self-powered clutch and pumping system for interchangeable connection to any of a variety of drive sources.

It is another object and advantage of the present invention to provide a pumping system which is self-contained and adaptable to connection to either an electrical or internal combustion driving source.

It is a further object and advantage of the invention to provide a pumping system having a pressure control switch which controls the operation of a magnetic clutch to selectively control the operation of the pump in the pumping system.

Other and further objects and advantages of the invention will become apparent from the following specification and drawings, and with reference to the appended claims.

DESCRIPTION OF THE PREFERRED EMBODIMENT

Figure 1:
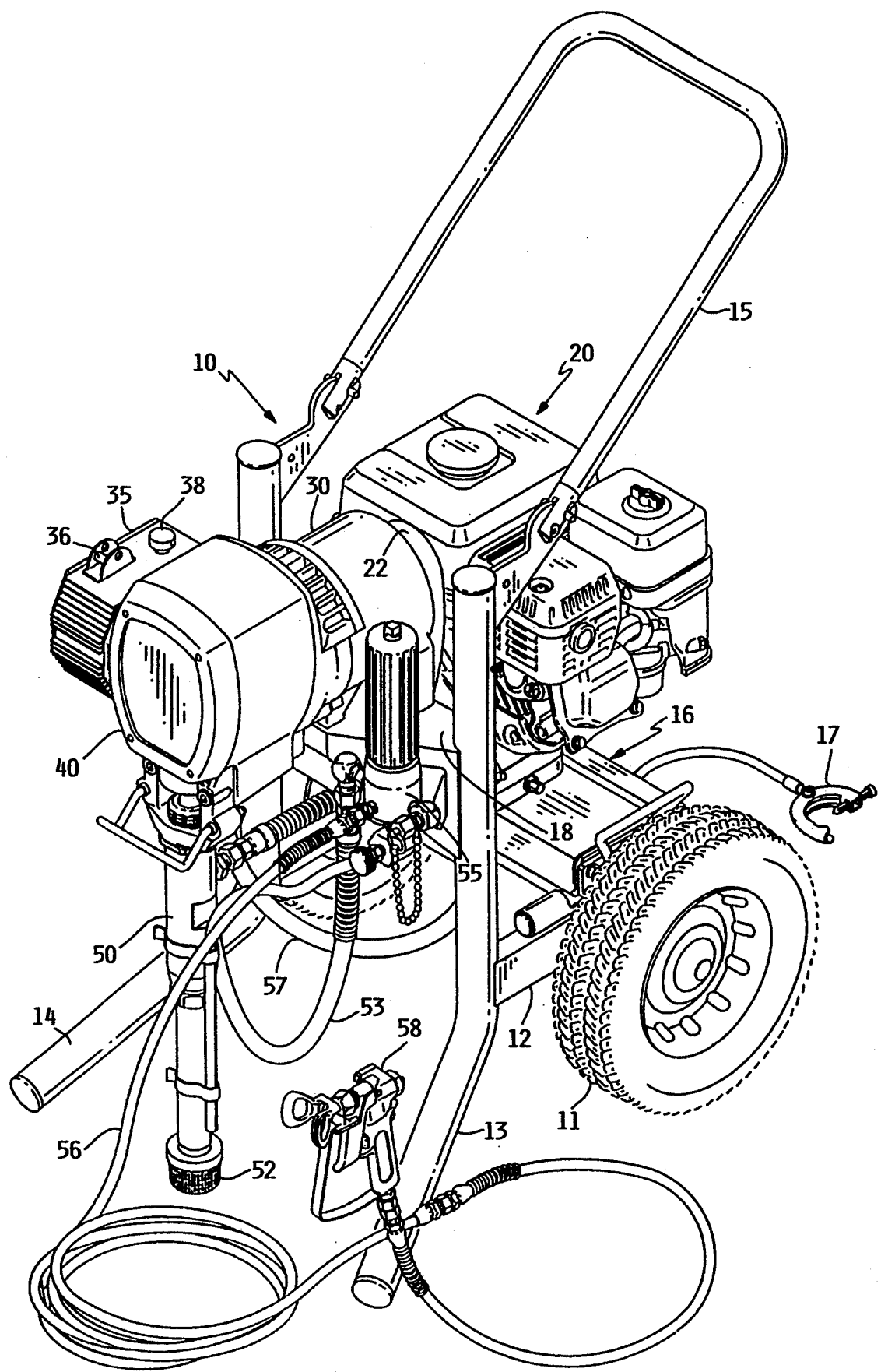
FIG. 1 shows an isometric view of a pumping system of the type which finds utility for use with the present invention.

FIG. 1 shows an isometric view of a pumping system of the type which finds utility with the present invention. The components of the invention are all installed on a wheeled cart 10 which may be portably moved from one job site to another. The pumping system of FIG. 1 is typical of portable pumping systems utilized in the industrial paint spray industry, wherein equipment is moved to a job site for spraying at the job site. The cart 10 comprises a frame 12 upon which are mounted a pair of wheels 11 and a pair of support legs 13, 14. An adjustable handle 15 is attached to the frame 12 for moving the cart from place to place. A motor mounting assembly 16 is adapted to secure either a gasoline engine or an electric motor to the frame 12. An electrical grounding clamp 17 is affixed via a suitable cable to frame 12, and a clutch housing mount 18 also forms a part of frame 12.

In the embodiment of FIG. 1, a gasoline engine 20 is shown affixed to the motor mounting assembly 16; an electrical drive motor could equally well be attached to motor mounting assembly 16. The gasoline engine has an output drive pulley (not shown) which is protected by a guard housing 22, and is mechanically coupled to an input pulley 24 (see FIG. 2) which is a part of the clutch/generator assembly.

Clutch housing 30 is affixed to clutch housing mounting assembly 18, and pump drive housing 40 is bolted to clutch housing 30. A downwardly extending reciprocable pump 50 is attached to pump drive housing 40. An electrical housing 35 is affixed to the side of frame 12. An on/off switch 36 and an adjustable pressure switch 38 are each attached to electrical housing 35.

Pump 50 has an intake 52 which, during operation, is immersed into a suitable container of liquid. The pump output is connected via a hose 57 to a fluid inlet port in electrical housing 35. The electrical housing 35 has a fluid outlet port which is connected via a hose 53 to a filter 55, and thence to a delivery hose 56. Delivery hose 56 is connected to a spray gun 58.

Figure 2:
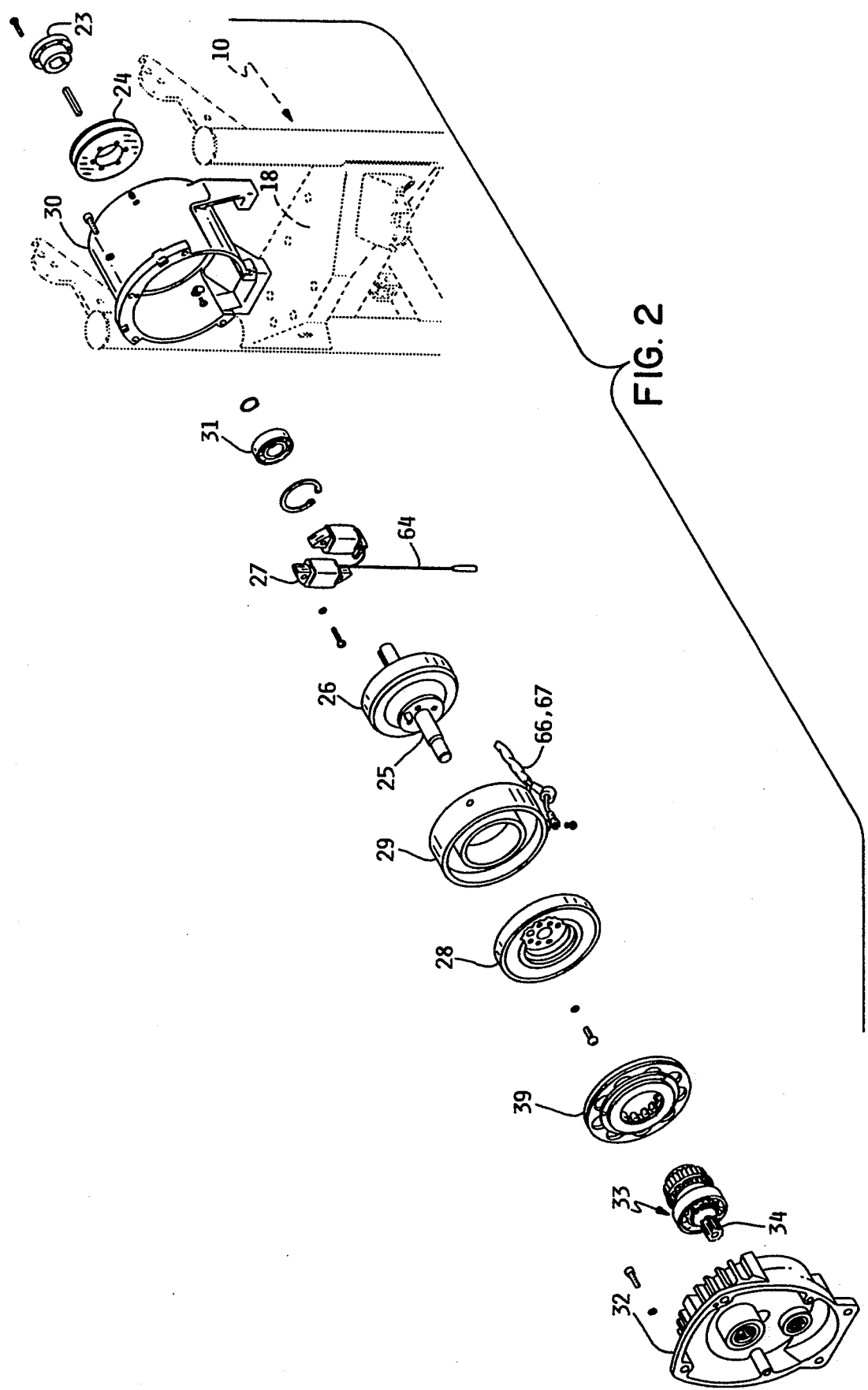
FIG. 2 shows an exploded view of the generator/clutch housing of the invention.

FIG. 2 shows an exploded view of a portion of the pumping system of FIG. 1, wherein a part of cart 10 is shown in dotted outline. Clutch housing 30 contains all of the components shown in exploded view in FIG. 2. A pinion housing 32 is affixed to the end of clutch housing 30, and a pinion output shaft 34 projects outwardly from pinion housing 32. A drive shaft 25 projects from the rightward end of clutch housing 30, and a locknut 23 is keyed to shaft 25, and affixes input pulley 24 thereto. A generator rotor 26 is also affixed to shaft 25, as is clutch plate 28. A stator 27 is mounted in fixed position within housing 30, as is a field winding 29. Drive shaft 25 is supported at its inlet end within housing 30 by means of a bearing 31, and is supported at its outlet end by means of bearings seated within pinion 33. Pinion 33 has an outer toothed surface, and clutch armature 39 has a set of interior teeth which are engageable against the pinion teeth, wherein armature 39 is slidably engaged along the transverse length of the pinion teeth.

Figure 3:
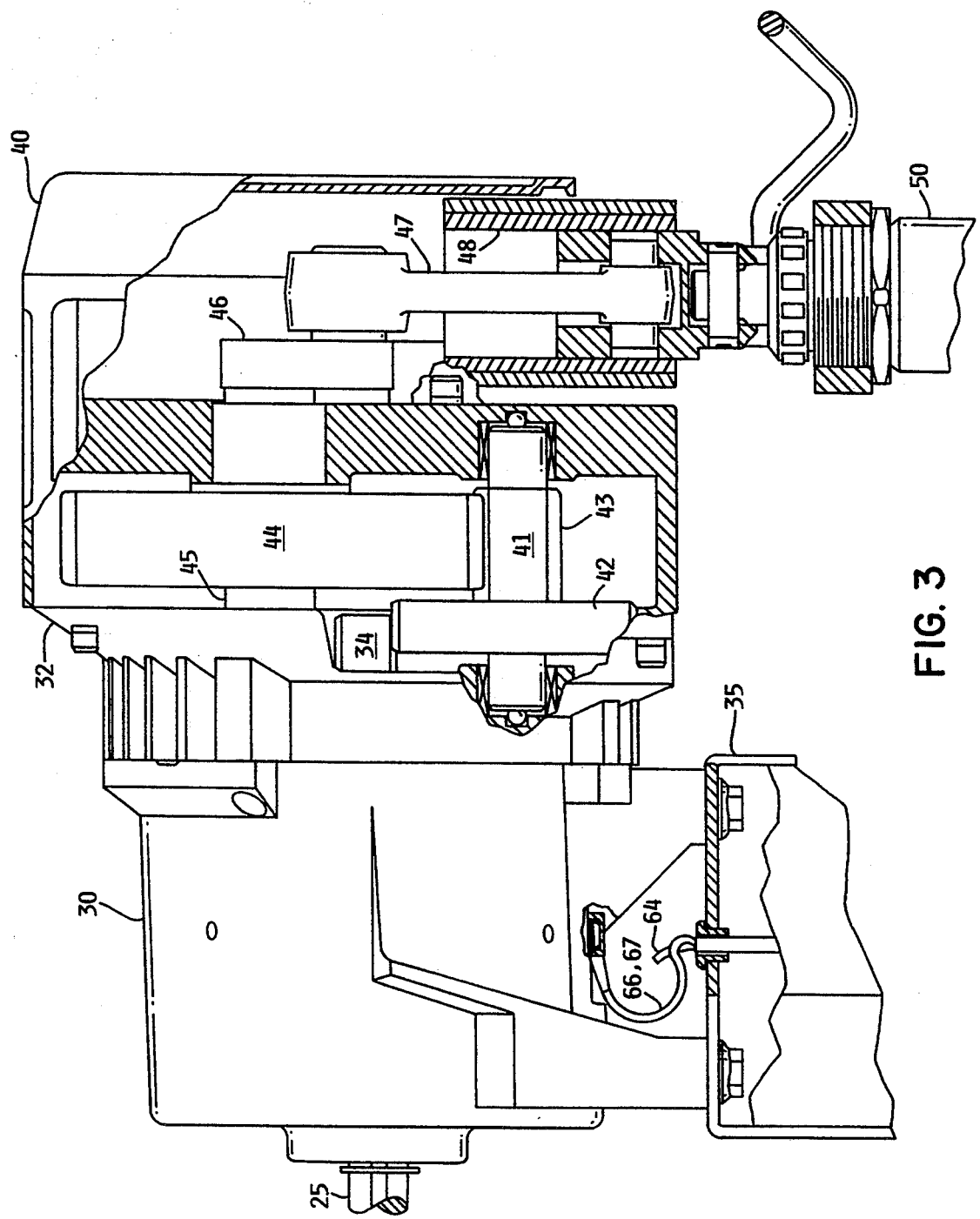
FIG. 3 shows a side cross section view of the clutch and pump drive housing of the invention.

FIG. 3 shows an elevation view of clutch housing 30, pinion housing 32 and pump drive housing 40, with the pump drive assembly shown in partial cross section and breakaway. An inlet gear shaft 41 is supported by bearings in pinion housing 32 and further bearings in pump drive housing 40. An inlet toothed gear 42 is affixed to gear shaft 41, and is engaged to teeth on pinion shaft 34. An intermediate gear 43 is affixed to shaft 41 and is engaged to a drive gear 44. Drive gear 44 is affixed to a shaft 45 which is supported by bearings between pinion housing 32 and pump drive housing 40. Shaft 45 is connected to a crank arm 46, which is also connected to a connecting rod 47. Connecting rod 47 is slidably guided within a sleeve 48, and is coupled to a movable piston within pump 50. Pump 50, and its associated piston and valving assemblies are typical of reciprocable pump assemblies which are known in the prior art.

Figure 4:
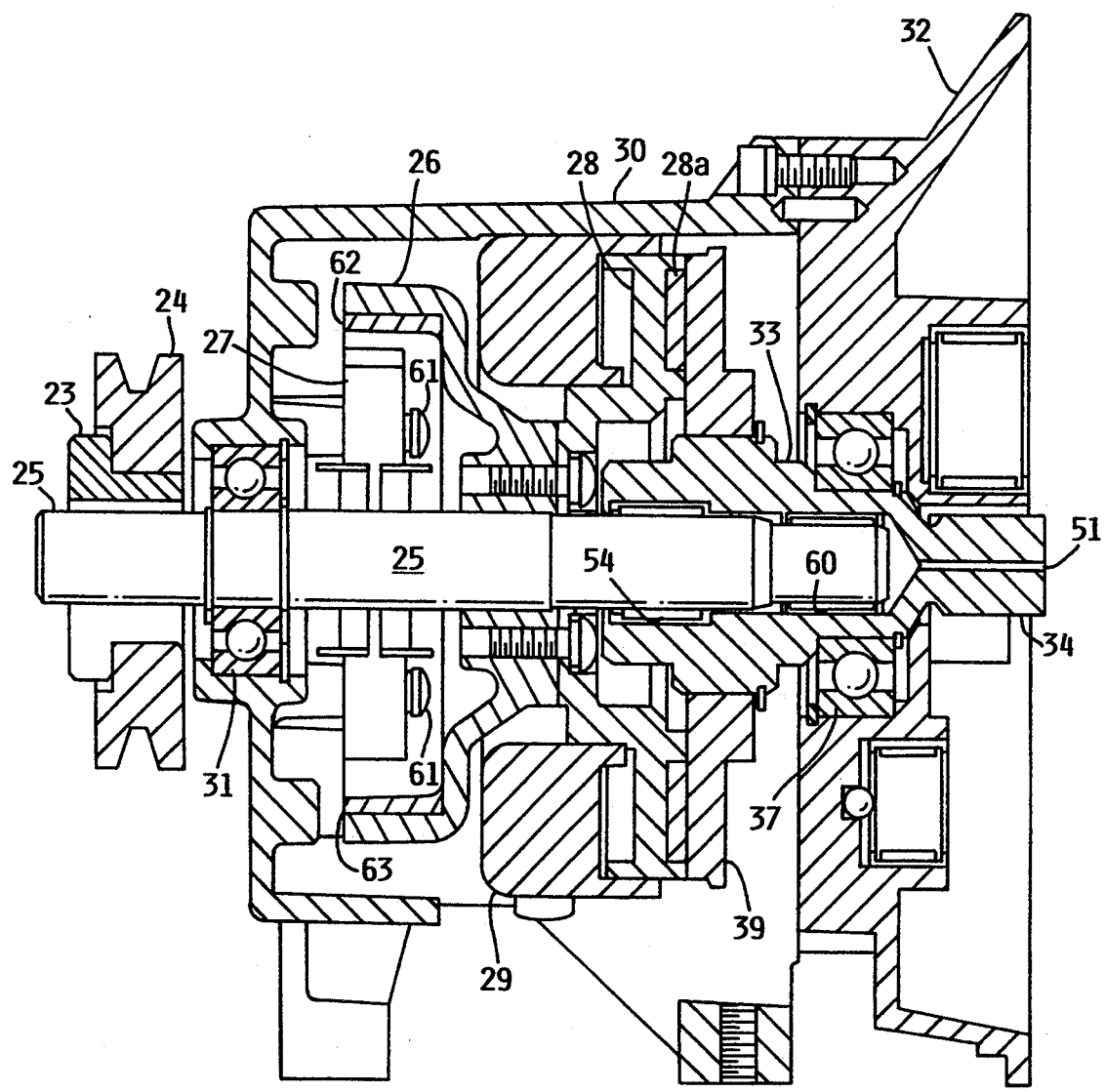
FIG. 4 shows a side cross section view of the generator/clutch housing of the invention.

FIG. 4 shows a side elevation view in cross section, illustrating the clutch and generator assembly. Drive shaft 25 is supported by a bearing 31 which is pressed into the walls of clutch housing 30 at one of its ends, and is supported by bearings 59 and 60 which are inserted into an axial opening in pinion 33 at its other end. Pinion 33 is supported by a bearing 37 mounted in pinion housing 32. Stator 27 is affixed to the interior of housing 30 by means of fasteners 61, and one of the stator winding wires is grounded to the housing 30. Stator winding wire 64 (see FIG. 3) is connected through housing 30 to the interior of electrical housing 35. Field winding 29 is fixedly retained within housing 30, and the field winding wires 66, 67 are also routed outside of housing 30 into electrical housing 35 (see FIG. 3). Rotor 26 and clutch plate 28 are affixed together by fasteners, and are also together affixed to drive shaft 25. Therefore, rotation of shaft 25 causes simultaneous rotation of rotor 26 and clutch plate 28. Clutch armature 39 is slidably engaged to pinion 33 along an axis parallel to shaft 25, and is therefore rotatable therewith. The surface of clutch plate 28 which faces toward armature 39 has an annular recess which is filled with a non-magnetic cork material 28a. The cork material 28a facilitates the engagement of clutch plate 28 against armature 39 when field winding 29 is energized. The magnetic forces generated by field winding 29 cause an attractive force against armature 39, thereby slidably moving armature 39 toward the facing surface of clutch plate 28. The cork material 28a and the metal faces of clutch plate 28 engage against the facing surface of armature 39 and permits rotational engagement to occur between clutch plate 28 and armature 39 within a partial revolution of drive shaft 25, thereby ensuring that the clutch becomes fully engaged nearly instantaneously.

Pinion output shaft 34 projects through pinion housing 32, and is engageable with an inlet gear 42 as has been hereinbefore described. The interior recess of pinion 33 has a pair of lubricated bearings 59, 60, for receiving and supporting drive shaft 25. A relief port 57 provides a passage between the interior recess of pinion 33 and the outer end of pinion shaft 34. This relief port provides a passage for excess lubricant oils, so that excess lubricants which may build up within the interior of the recess for pinion 33 are bled outwardly into the adjoining pump drive housing, rather than inwardly into the generator/clutch housing. If such lubricants were to accumulate within the generator/clutch housing 30, they may degrade the operation of clutch plate 28.

Figure 5:
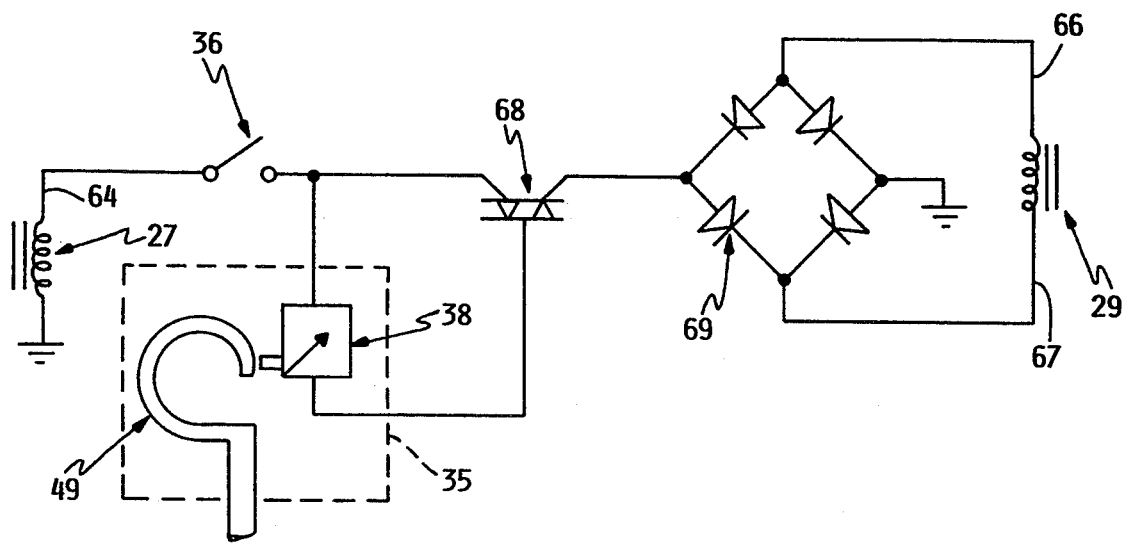
FIG. 5 shows a schematic diagram of the electrical components of the invention.

FIG. 5 shows an electrical schematic diagram of the electrical components of the invention. The rotation of drive shaft 25 causes coincidental rotation of rotor 26, and rotor 26 has a pair of diametrically opposed permanent magnets 62, 63 affixed along the interior surface thereof. Permanent magnets 62, 63 rotate about stator winding 27, and induce a voltage across stator winding 27. Stator winding 27 is coupled to an on/off switch 36 via wire 64. Switch 36 is coupled to an adjustable pressure switch 38 and to a semiconductor triac 68. The adjustable pressure switch 38 is contained within electrical housing 35, and operates in conjunction with a Bourdon tube pressure sensor 49 to provide a switchable signal whenever the liquid pressure at the pump 50 outlet exceeds a predetermined value. The Bourdon tube pressure sensor 49 and adjustable pressure switch 39 is disclosed in U.S. Pat. No. 4,323,741, issued Apr. 6, 1982, and owned by the assignee of the present invention. When pressure switch 38 is closed it passes a signal to triac 68, thereby turning the triac on. This allows the alternating voltage across stator winding 27 to be conveyed to a full wave rectifier circuit 69. The output from rectifier circuit 69 is a DC voltage which is applied to field winding 29, thereby creating a magnetic field which causes clutch armature 39 to slidably move along pinion 33 toward clutch plate 28.

In operation, a suitable motor element, either an electrical motor or an internal combustion engine, is coupled via a belt to the input pulley 24. This causes drive shaft 25 to begin rotating, and thereby induces a voltage across stator winding 27. When the on/off switch 36 is actuated the voltage across the stator winding is applied to the pressure sensor switch 38, which is normally closed. The stator winding voltage is then applied via triac 68 and bridge circuit 69 to field winding 29, thereby causing a magnetic field to be developed. The magnetic field attracts the clutch armature 39 into engagement against clutch plate 28, and causes rotation of pinion 33 in synchronism with drive shaft 25. As pinion 33 rotates its pinion shaft 34 rotates, thereby creating the requisite mechanical rotation for operating the pump 50. Pump 50 delivers pressurized liquid to a spray gun 58 until the spray gun trigger is disengaged. When the spray gun trigger is disengaged the back pressure in the liquid delivery lines is eventually sensed by pressure sensor 49, causing pressure sensor switch 38 to become disengaged. The disengaging of pressure switch 38 removes the voltage from the field winding 29, thereby removing the magnetic attraction force against armature 39. This causes armature 39 to become disengaged from clutch plate 28 and removes the driving force for pump 50. Pump 50 ceases its reciprocable operation until a pressure drop occurs in the system, wherein the operation resumes according to the description above.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A portable spraying system adapted for interchangeable power sources, comprising:
   a) a cart having an upper platform for attachment of a pumping assembly and a lower platform for removable attachment of a power source;
   b) a clutch housing attached to said upper platform, said clutch housing having a projecting drive shaft extending over said lower platform, said drive shaft having a drive pulley thereon;
   c) a pump housing attached to said clutch housing, said pump housing having an input drive gear and means for actuating a liquid pump;
   d) a pinion shaft mounted in said clutch housing in axial alignment with said drive shaft, with said pinion shaft extending outwardly from said clutch housing to engage said input drive gear;
   e) a clutch plate affixed to said drive shaft in said clutch housing, and a clutch armature slidably mounted to said pinion shaft;
   f) a generator stator affixed inside said clutch housing and a generator rotor attached to said drive shaft and to said clutch plate; and
   g) means for deriving electrical energy from said generator stator for magnetically actuating said armature into contact against said clutch plate.

2. The apparatus of claim 1, wherein said means for deriving electrical energy further comprises a pressure sensor and bridge circuit, and electrical connection from said generator stator to said pressure sensor, and electrical connection from said pressure sensor to said bridge circuit, and a field winding about said clutch plate, said field winding electrically connected to said bridge circuit.

3. The apparatus of claim 2, wherein said pressure sensor further comprises a movable pressure-responsive member in liquid flow communication with said pump, and a switch actuator in contact with said pressure-responsive member.

4. The apparatus of claim 1, further comprising an axial bore in said pinion shaft end in said clutch housing, and an end of said drive shaft rotatably seated in said axial bore.

5. The apparatus of claim 4, wherein said pinion shaft further comprises an enlarged surface portion in said clutch housing, said enlarged surface portion having a plurality of axially extending splines uniformly arranged about said surface portion; and said clutch armature further comprises a central opening having a plurality of teeth sized for slidable engagement with said surface.

6. The apparatus of claim 5, wherein said magnetic clutch plate further comprises an annular recess facing said clutch armature, and a cork material filling said recess.

7. The apparatus of claim 5, further comprising a passage in said pinion shaft between said axial bore and a pinion shaft end outside said clutch housing.

8. A portable spraying system adapted for connection to either an electric motor driving source or an internal combustion engine driving source, comprising:
   a) a cart having a frame portion for receiving a driving source and a frame portion for receiving a pump;
   b) a first housing affixed to said frame portion for receiving a pump, said first housing having a drive shaft and pulley extending from a first end at a position elevated above said frame portion for receiving a drive source;
   c) a generator stator and rotor in said first housing, said rotor affixed to said drive shaft and said stator affixed to said first housing;
   d) a clutch plate affixed to said generator rotor, and a fixed field coil adjacent said clutch plate;
   e) a pinion shaft extending from a second end of said first housing in alignment with said drive shaft, said pinion shaft having a toothed surface inside said first housing and a central bore aligned with said drive shaft, said central bore receiving an end of said drive shaft;
   f) a clutch armature having a central toothed opening slidably engageable to said enlarged toothed surface, and slidable into contact against said clutch plate;
   g) a pump drive housing affixed to said first housing and having a drive gear engageable with said pinion shaft, and having a pump drive shaft connected to said drive gear; and
   h) a liquid pump connected to said pump drive shaft.

9. The apparatus of claim 8, further comprising a second housing affixed to said first housing, said second housing having electrical circuit means for energizing said field coil, said electrical circuit means having an input connected to said generator stator.

10. The apparatus of claim 9, wherein said clutch plate further comprises an annular groove facing said armature and a cork material filling said annular groove.

11. The apparatus of claim 9, wherein said electrical circuit means further comprises a pressure-responsive switch means for connecting to said pump.

12. The apparatus of claim 11, wherein said pinion central bore further comprises at least one bearing for supporting said end of said drive shaft.

13. The apparatus of claim 12, further comprising a passage in said pinion extending from said central bore to an end of said pinion shaft extending from said first housing.

14. The apparatus of claim 13, wherein said pump further comprises a reciprocable pump.

15. The apparatus of claim 14, wherein said electrical circuit means further comprises a pressure-responsive switch means for connecting to said pump.

* * * * *